(12) United States Patent
Valencia, Jr. et al.

(10) Patent No.: US 9,381,451 B2
(45) Date of Patent: Jul. 5, 2016

(54) QUIESCENT ZONE FLUID FILTER

(75) Inventors: Pablo Valencia, Jr., Northville, MI (US); Brian K. Bartnick, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1035 days.

(21) Appl. No.: 13/413,079

(22) Filed: Mar. 6, 2012

(65) Prior Publication Data

US 2013/0233414 A1    Sep. 12, 2013

(51) Int. Cl.

| B01D 46/26 | (2006.01) |
| B01D 21/26 | (2006.01) |
| F16K 11/085 | (2006.01) |
| B01D 46/24 | (2006.01) |
| F16K 11/083 | (2006.01) |

(Continued)

(52) U.S. Cl.
CPC .......... *B01D 21/265* (2013.01); *B01D 21/0087* (2013.01); *B01D 21/2405* (2013.01); *B01D 21/2444* (2013.01); *B01D 46/2414* (2013.01); *F16K 3/262* (2013.01); *F16K 5/0407* (2013.01); *F16K 5/0605* (2013.01); *F16K 11/0833* (2013.01); *F16K 11/0836* (2013.01); *F16K 11/0853* (2013.01); *F16K 11/0856* (2013.01); *C02F 2301/043* (2013.01); *Y10T 137/794* (2015.04); *Y10T 137/8013* (2015.04); *Y10T 137/86646* (2015.04); *Y10T 137/86726* (2015.04); *Y10T 137/86871* (2015.04); *Y10T 137/87177* (2015.04); *Y10T 137/87587* (2015.04)

(58) Field of Classification Search
CPC .............. B01D 21/265; B01D 46/2414; C02F 2301/043; F16K 11/0853; F16K 11/0856; F16K 11/0833; F16K 5/0605; F16K 11/0836; Y10T 137/86871; Y10T 137/794; Y10T 137/86726; Y10T 137/87177; Y10T 137/87587; Y10T 137/86646
USPC .......... 137/268, 544, 599.14, 599.15, 625.29, 137/625.47, 205.5, 596.12, 625.46, 888; 210/607, 790, 802, 265, 268, 434; 55/459.2
See application file for complete search history.

(56) References Cited

U.S. PATENT DOCUMENTS

| 1,122,848 A | 12/1914 | Bloom |
| 2,051,278 A | 8/1936 | Svenson |

(Continued)

FOREIGN PATENT DOCUMENTS

| CN | 201894953 U | 7/2011 |
| DE | 1486819 A1 | 8/1969 |

OTHER PUBLICATIONS

Generic variable flow control valve, believed in use at least since 2010.

(Continued)

*Primary Examiner* — Atif Chaudry
(74) *Attorney, Agent, or Firm* — Quinn Law Group, PLLC

(57) ABSTRACT

A quiescent zone fluid filter. A reservoir communicates via upstream and downstream communication ports with a fluid flow tube. At the upstream communication port, liquid flowing in the fluid flow tube enters a quiescent zone of the reservoir, whereupon particles therein descend. The liquid then rejoins the fluid flow tube at the downstream communication port free of particles therein. The quiescent zone fluid filter is advantageously implemented within a fluid flow control valve, as for example at the valve barrel of a barrel valve.

8 Claims, 4 Drawing Sheets

(51) Int. Cl.
*F16K 5/06* (2006.01)
*B01D 21/00* (2006.01)
*B01D 21/24* (2006.01)
*F16K 3/26* (2006.01)
*F16K 5/04* (2006.01)

(56) References Cited

U.S. PATENT DOCUMENTS

| | | | |
|---|---|---|---|
| 2,407,190 A * | 9/1946 | Tait | 210/416.1 |
| 2,547,116 A | 4/1951 | Gould | |
| 2,578,396 A | 12/1951 | Brown | |
| 2,660,317 A * | 11/1953 | Mork et al. | 210/434 |
| 3,133,723 A | 5/1964 | Goldman et al. | |
| 3,379,312 A | 4/1968 | Brown | |
| 3,991,975 A | 11/1976 | Sibrava | |
| 3,993,099 A | 11/1976 | Nightingale | |
| RE30,224 E | 3/1980 | Ortega | |
| 4,262,880 A | 4/1981 | Danko et al. | |
| 4,271,020 A * | 6/1981 | Van Meter | B01D 29/96 137/599.11 |
| 4,540,025 A | 9/1985 | Ledeen et al. | |
| 4,890,817 A | 1/1990 | Uri | |
| 4,958,802 A | 9/1990 | Underwood | |
| 5,037,067 A | 8/1991 | Ray | |
| 5,113,909 A | 5/1992 | Marin et al. | |
| 5,152,321 A | 10/1992 | Drager et al. | |
| 5,188,144 A | 2/1993 | Radossi | |
| 5,234,193 A | 8/1993 | Neal, Jr. et al. | |
| 5,327,929 A | 7/1994 | Radossi | |
| 5,511,584 A | 4/1996 | Leinen | |
| 5,607,582 A * | 3/1997 | Yamazaki | B01D 29/15 210/234 |
| 5,680,889 A | 10/1997 | Boger | |
| 5,771,929 A | 6/1998 | Boger | |
| 5,826,854 A * | 10/1998 | Janvrin | B01D 27/08 137/549 |
| 5,906,297 A | 5/1999 | Cole | |
| 5,931,196 A | 8/1999 | Bernardi et al. | |
| 6,575,195 B2 | 6/2003 | Wichmann | |
| 6,874,759 B2 | 4/2005 | Aoshima et al. | |
| 7,044,436 B2 | 5/2006 | Corbetta et al. | |
| 8,356,716 B1 | 1/2013 | Kruckenberg et al. | |
| 8,845,896 B2 * | 9/2014 | Kruckenberg et al. | 210/235 |
| 2006/0137536 A1 | 6/2006 | De Jong | |
| 2006/0231784 A1 * | 10/2006 | Quitmeyer | F16K 31/047 251/129.11 |
| 2008/0000820 A1 * | 1/2008 | Mitchell | B01D 35/147 210/141 |

OTHER PUBLICATIONS

Faucet Valve Insert having diagonally disposed O-ring and channel therefor of Moen Incorporated, North Olmstead, OH 44070. Believed on the market at least since 1990.
Generic Prior Art O-Rings and Channels Therefor. Known since at least before 2010.
U.S. Appl. No. 13/118,751, filed May 31, 2011; inventors: Brian K. Bartnick, Pablo Valencia, Jr., Corry W. Johnson, and Bill F. Tompkins.
U.S. Appl. No. 13/439,193, filed Apr. 4, 2012; inventors: Brian K. Bartnick and Jr., Corry W. Johnson.
U.S. Appl. No. 13/216,631, filed Aug. 24, 2011; inventors: Brian K. Bartnick and Corry W. Johnson.

* cited by examiner

QUIESCENT ZONE FLUID FILTER

TECHNICAL FIELD

The present invention relates to fluid filters, and more particularly to a quiescent zone fluid filter which promotes deposition of particles present in a flowing fluid trappingly into a fluidic reservoir of the filter.

BACKGROUND OF THE INVENTION

Filters are used to remove particulates suspended or otherwise present in flowing fluids. Most commonly with respect to liquids, a porous medium filter is utilized, wherein the porous medium, as for example a paper material, allows the liquid molecules to flow through the pores freely, but particles carried by the liquid are detained, as they are sized too large to pass through the pores. While porous medium filters work well, problematically, such a filter can become burdened with particles resulting in sluggish liquid flow, high pressure differential thereacross, as well as necessity to remove and replace the porous medium, if not the entire filter.

What remains needed in the art is a fluid filter that reduces fluid pressure drop thereacross and performs filtering for a lengthy time without clogging as compared with a conventional porous medium filter; further, it would be very advantageous if such an improved fluid filter could be somehow integrally packaged with a fluid flow control valve, as for example a barrel valve, in order to reduce over-all packaging requirements. In this regard, a conventional barrel valve is typically configured with an outer valve housing and an inner valve barrel rotatively disposed within the outer valve housing, wherein the inner valve barrel is molded with open cavities or formed of solid metal with a machined passage for selectively communicating (based upon rotative position of the inner valve barrel with respect to the outer valve housing) with inlet and outlet valve ports of the outer valve housing.

SUMMARY OF THE INVENTION

The present invention is a fluid filter that reduces fluid pressure drop thereacross and performs filtering for a lengthy time without clogging as compared with a conventional porous medium filter; the present invention further provides an improved fluid filter that is integrally packaged with a fluid flow control valve in order to reduce over-all packaging requirements.

The quiescent zone fluid filter according to the present invention is intended to operate with flowing fluids, more particularly flowing liquids (the terms "liquid" and "fluid" being interchangeable), wherein a reservoir communicates via upstream and downstream communication ports with a fluid flow tube. At the upstream communication port, liquid flowing in the fluid flow tube is disposed above, that is in gravitationally superior relation to, the first communication port such as to promote descending entry of particles and entry of a portion of the flowing liquid with any particles present therein into a "quiescent zone" of fluid flow that is provided by the reservoir. By "quiescent zone" is meant the fluid thereat is substantially stagnant, having disposed therein a sluggish fluid flow from the upstream communication port to the downstream communication port, where fluid of the reservoir exits to the fluid flow tube. This quiescent zone promotes any particles which have entered thereinto to settle gravitationally in the liquid to the gravitationally lowest elevation, or bottom, of the reservoir due to a dwell time therein of the sluggish fluid flow. This dwell time is the result of the sluggish fluid flow, that is a slow fluid flow velocity as compared with the flow velocity of the fluid flowing in the fluid flow tube, from the upstream communication port to the downstream communication port, where it rejoins the liquid flow of the fluid flow tube, now free of particles. The sluggish fluid flow in the reservoir is much slower than the velocity of the fluid flow through the fluid flow tube due to the large cross-sectional area of the reservoir as compared to the cross-sectional area of the fluid flow tube.

The shape of the fluid flow tube is preferred to provide an upstream communication port particle entry agency which serves to apply force on the particles to urge their entry into the upstream communication port. Additionally, the fluid flow tube is configured to provide a venturi effect at the downstream communication port which promotes, by pressure differential, the fluid in the reservoir to exit at the downstream communication port and rejoin the fluid flowing in the fluid flow tube.

In a most preferred application of the quiescent zone fluid filter according to the present invention, the quiescent zone fluid filter is internally packaged within a fluid flow control valve, as for example a barrel valve. In a barrel valve example, the reservoir is disposed within the inner valve barrel and the fluid flow tube is connected with the inner valve barrel at a gravitationally superior location with respect to the reservoir. The fluid flow tube is in selective communication with inlet and outlet ports of an outer valve housing of the barrel valve as per rotative movement of the inner valve barrel with respect to the outer valve housing to thereby provide an operative valve action for regulating fluid flow.

Accordingly, it is an object of the present invention to provide a fluid filter that reduces fluid pressure drop thereacross and performs filtering for a lengthy time without clogging as compared with a conventional porous medium filter; the present invention further provides an improved fluid filter that is integrally packaged with a fluid flow control valve in order to reduce over-all packaging requirements.

This and additional objects, features and advantages of the present invention will become clearer from the following specification of a preferred embodiment.

BRIEF DESCRIPTION OF THE DRAWINGS

FIG. 7 shows the barrel valve at a partly open (or closed) state, and FIG. 8 shows the barrel valve at its closed state.

DESCRIPTION OF THE PREFERRED EMBODIMENT

Figure 1:
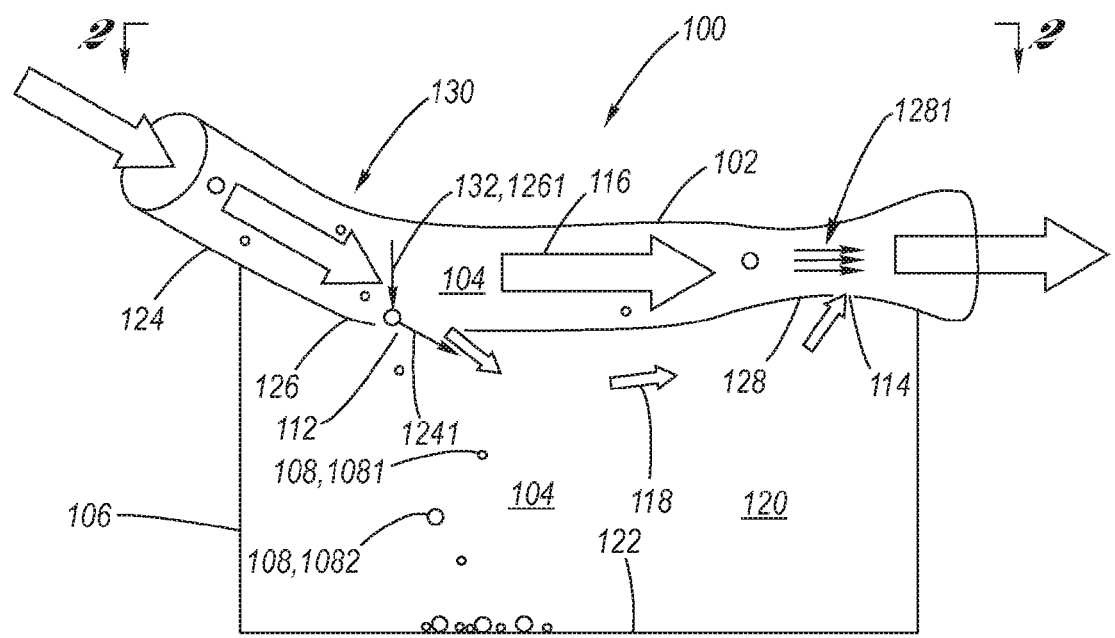
FIG. 1 is a schematic side view of the quiescent zone fluid filter according to the present invention, shown in an exemplar mode of operation.

Referring now to the Drawing, FIGS. 1 through 9 depict various aspects of a quiescent zone fluid filter according to the present invention.

Figure 2:
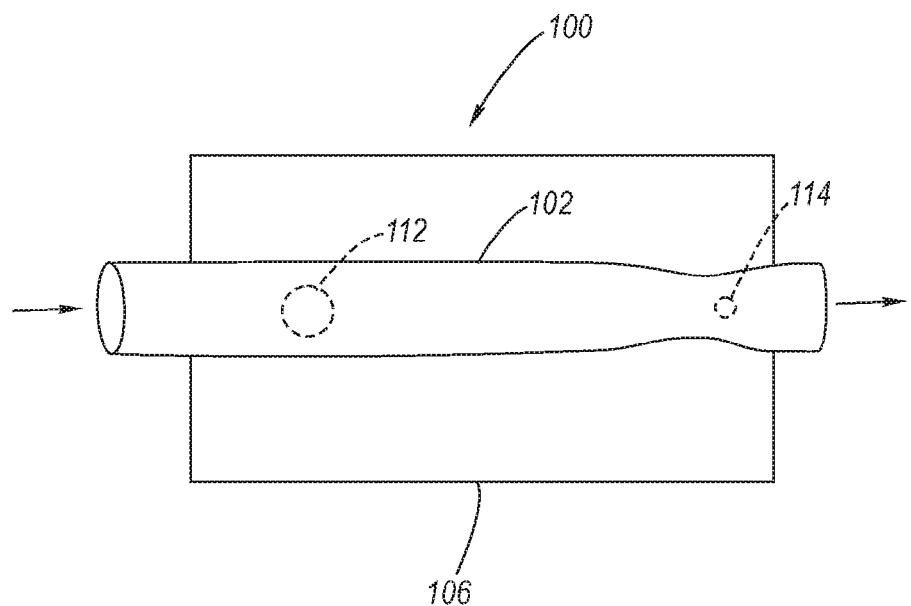
FIG. 2 is a schematic top view of the quiescent zone fluid filter, seen along line 2-2 of FIG. 1.
Figure 3:
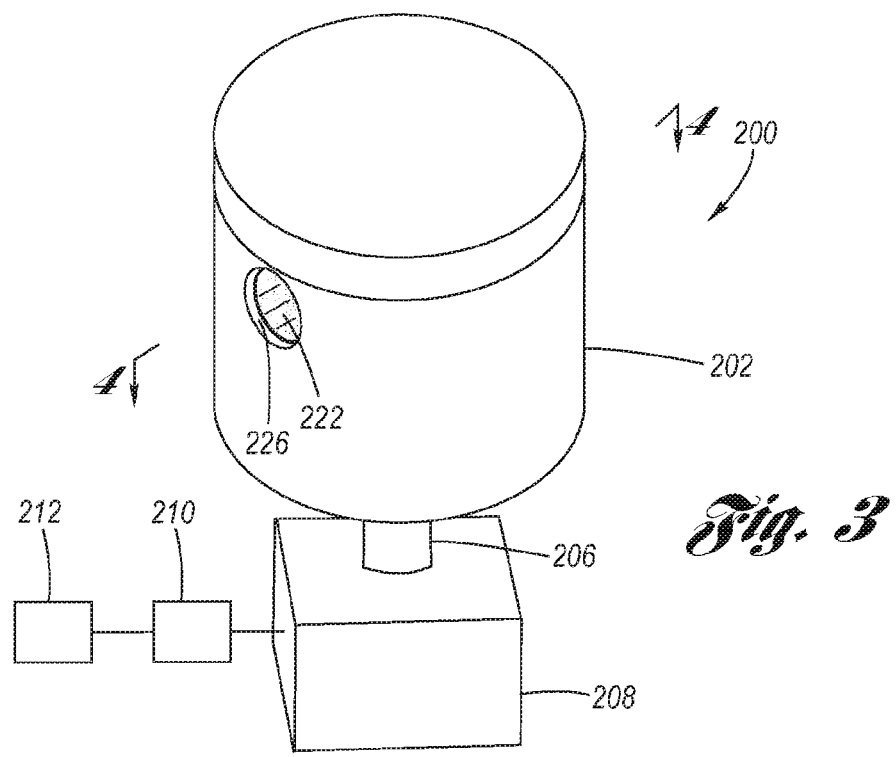
FIG. 3 is a perspective view of a fluid flow control valve, in the exemplar form of a barrel valve, equipped with the quiescent zone fluid filter according to the present invention.

Turning attention firstly to FIGS. 1 and 2, the principles of operation of the quiescent zone fluid filter 100 according to the present invention will be detailed.

A fluid flow tube 102 is provided through which a fluid 104 (that is, more particularly, a liquid) flows. A reservoir 106 is disposed adjacent, and below, that is in gravitationally inferior relation to, the fluid flow tube 102. The reservoir 106 has an average cross-sectional area much larger than that of the average cross-sectional area of the fluid flow tube 102, as for example more than an order of magnitude greater. The fluid 104 fills both the fluid flow tube 102 and the reservoir 106. The fluid flow tube 102 and the reservoir 106 fluidically communicate with one another via an upstream communication port 112 and a downstream communication port 114, both being disposed above, that is in gravitationally superior relation, with respect to the reservoir.

The fluid 104 may have therein particles 108, which may include relatively smaller particles 1081 and relatively larger particles 1082. The particles 108 consist of any particulate debris in the liquid 104, whether in suspension or not.

At the upstream communication port 112, liquid 104 flowing in the fluid flow tube 102 is disposed above, that is in gravitationally superior relation to, the first communication port such as to promote descending entry of larger particles 1082 in the liquid, as well as a portion of the flowing fluid along with any particles 108 therein. The entering fluid and particles, pass into a quiescent zone 120 provided by the reservoir 106 due to the relatively large volume of the reservoir. By "quiescent zone" is meant the fluid thereat is substantially stagnant, having disposed therein a sluggish fluid flow 118 from the upstream communication port 112 to the downstream communication port 114, where fluid of the reservoir exits to fluid flow tube.

The quiescent zone 120 promotes any particles 108 which have entered thereinto to settle gravitationally in the liquid to the gravitationally lowest elevation, or bottom 122, of the reservoir due to a dwell time therein of the sluggish fluid flow 118. This dwell time is the result of the sluggish fluid flow 118, that is a slow fluid flow velocity as compared with the flow velocity of the fluid flowing in the fluid flow tube, from the upstream communication port 112 to the downstream communication port 114, where it rejoins the liquid flow of the fluid flow tube, now free of particles. The sluggish fluid flow 118 in the reservoir 106 is much slower than the velocity of the fluid flow through the fluid flow tube due to the large cross-sectional area of the reservoir as compared to the cross-sectional area of the fluid flow tube 102 (see comparatively FIGS. 1 and 2).

As depicted best at FIG. 1, the shape of the fluid flow tube 102 is preferred to provide an upstream communication port particle entry agency 130 which serves to urge the particles 108, particularly the larger particles 1082, to enter into the upstream communication port 112. For example, a gravitational gradient 124 of the fluid flow tube 102 disposed upstream of the upstream communication port 124 provides a gravitationally downward momentum 1241 on the particles 108, particularly the larger particles 1082, toward entry into the upstream communication port 112. For another example, the fluid flow tube 102 has a bend 126 disposed upstream of the upstream communication port 112 which serves to provide a downward centrifugal force 1261 which urges the particles 108 to enter into the upstream communication port. For yet another example, the upstream communication port 112 has an opening cross-sectional area that is much larger than the opening cross-sectional area of the downstream communication port 114, whereby gravity supplies a force 132 on the particles to urge them into the upstream communication port.

As further depicted at FIG. 1, a cross-sectional area reduction 128 in the fluid flow pipe 102 is localized adjacent the downstream communication port 114 which provides a venturi effect 1281 at the downstream communication port. The venturi effect 1281 provides, under the physics of fluid flow, a pressure differential thereat, lower pressure in the fluid flow tube than in the reservoir, because of increased rapidity of the fluid flow at the cross-sectional area reduction 128 in relation to the fluid flow adjacently elsewhere in the fluid flow tube. This pressure differential of the venturi effect 1281 urges the fluid in the reservoir to exit at the downstream communication port 114.

Turning attention now to FIGS. 3 through 9, a most preferred application of a quiescent zone fluid filter according to the present invention will be detailed in which the quiescent zone fluid filter is internally packaged (i.e., integrated) into a fluid flow control valve.

As shown at FIGS. 3 through 6, a fluid flow control valve 200, exemplified by a barrel valve, has an outer valve housing 202. As additionally shown at FIGS. 4 through 6, disposed within the outer valve housing 202 is an inner valve barrel 204 which is rotatively movable with respect to the outer valve housing 202 via, for example, a stem 206 which connects to a drive mechanism 208, as for example a stepper motor, that is preferably actuated in response to an electronic controller 210 as per its programming and input from one or more sensors 212. A reservoir 220 is defined by an internal hollow 218 of the inner valve barrel 204. A fluid flow tube 222 is connected to the inner valve barrel 204 at a gravitationally superior position relative to the reservoir and is in selective communication, depending on the rotative position of the inner valve barrel with respect to the outer valve housing 202, with an inlet port 226 and an outlet port 228 of the outer valve housing. Each of the inlet and outlet ports 226, 228 is structured to connect to a fluid flow circuit 216, as for example a coolant system of a motor vehicle, via, for example, fittings 230.

In the example depicted, a venturi effect 240 is established in the fluid flow tube 222 at, by way of example, the central portion 224 thereof by a fluid flow tube taper 232 characterized by a tapering reduction in cross-sectional area toward the center from each respective end. The cross-sectional area reduction causes an increased fluid flow rate thereat, which, under the principles of fluid physics, provides a reduced pressure in the fluid flow tube thereat as compared to the fluid pressure in the reservoir. Accordingly, the downstream communication port 242 is disposed at the venturi effect 240, while the upstream communication port 244 is disposed adjacent the inlet port 226. While a taper 232 of the fluid flow tube 222 is the preferred structure to provide the venturi effect 240, another hydrodynamical feature which also provides a venturi effect via reduced cross-sectional area may be utilized, such as a flow path restrictor within the fluid flow tube. Both the fluid flow tube 222 and the reservoir 220 are filled with a fluid (more particularly a liquid) 214.

The reservoir 220 provides a quiescent zone 250 (as defined above) of sluggish fluid flow 252, wherein a low fluid velocity with low pressure drop is obtained at the upstream communication port 244 by directing a partial fluid flow 256 from main fluid flow 258 of the fluid flow tube 222. Any particles 272 that enter the quiescent zone 250 gravitationally descend in the liquid 214 and arrive at the bottom 260 of the reservoir, as defined by the internal hollow 218 of the inner valve barrel 204.

Figure 4:
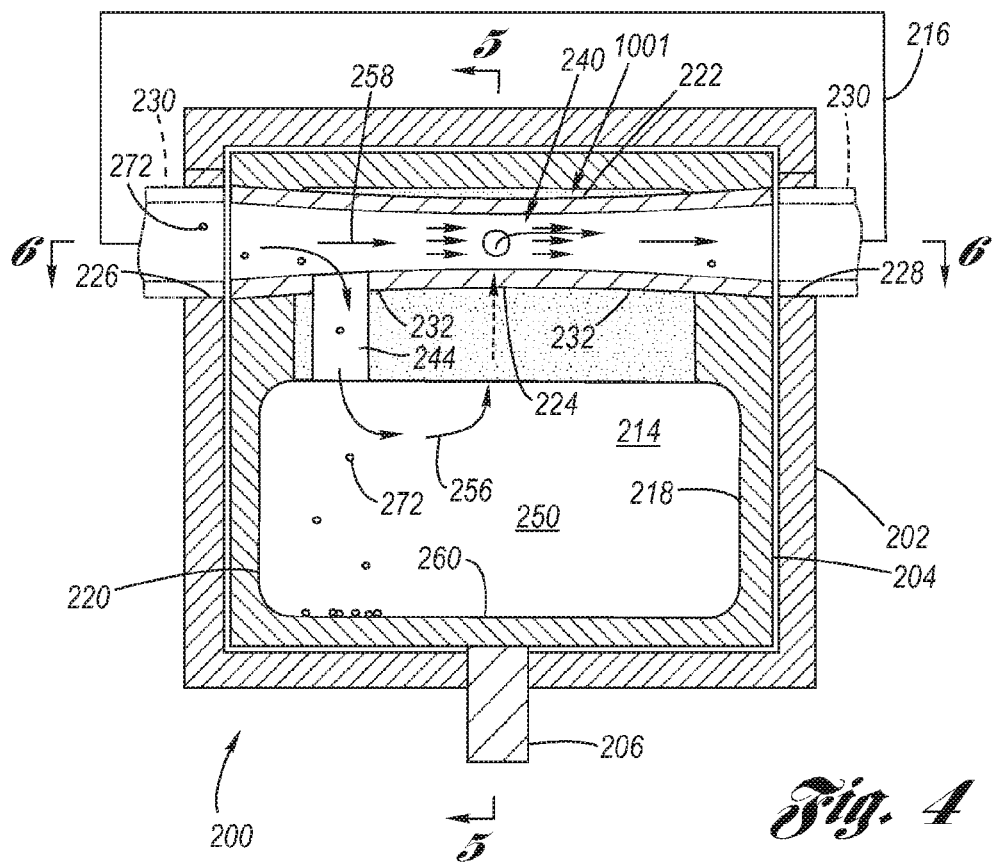
FIG. 4 is a sectional view of the barrel valve equipped with the quiescent zone fluid filter, seen along line 4-4 of FIG. 3.
Figure 5:
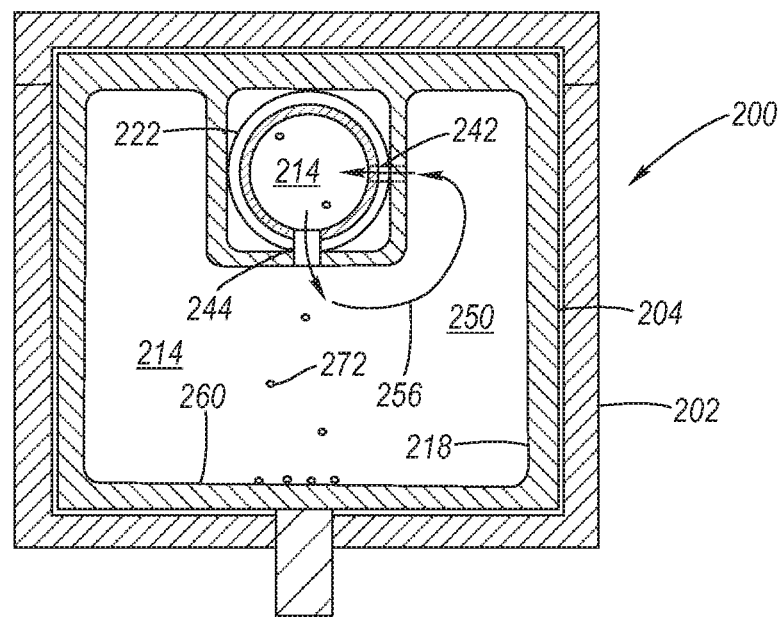
FIG. 5 is a sectional view of the barrel valve equipped with the quiescent zone fluid filter, seen along line 5-5 of FIG. 4.
Figure 6:
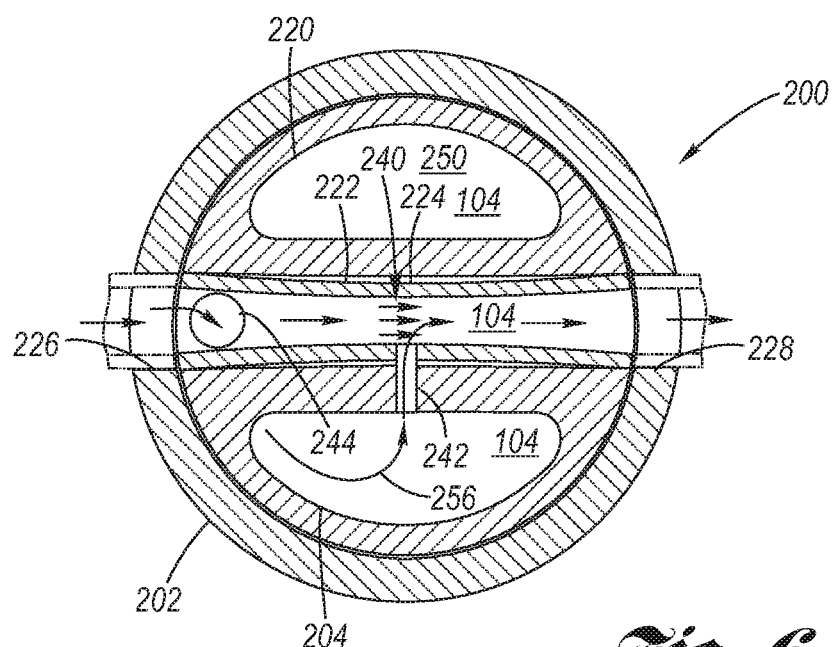
FIG. 6 is a sectional view of the barrel valve equipped with the quiescent zone fluid filter, seen along line 6-6 of FIG. 4, wherein the barrel valve is at its fully open state.
Figure 7:
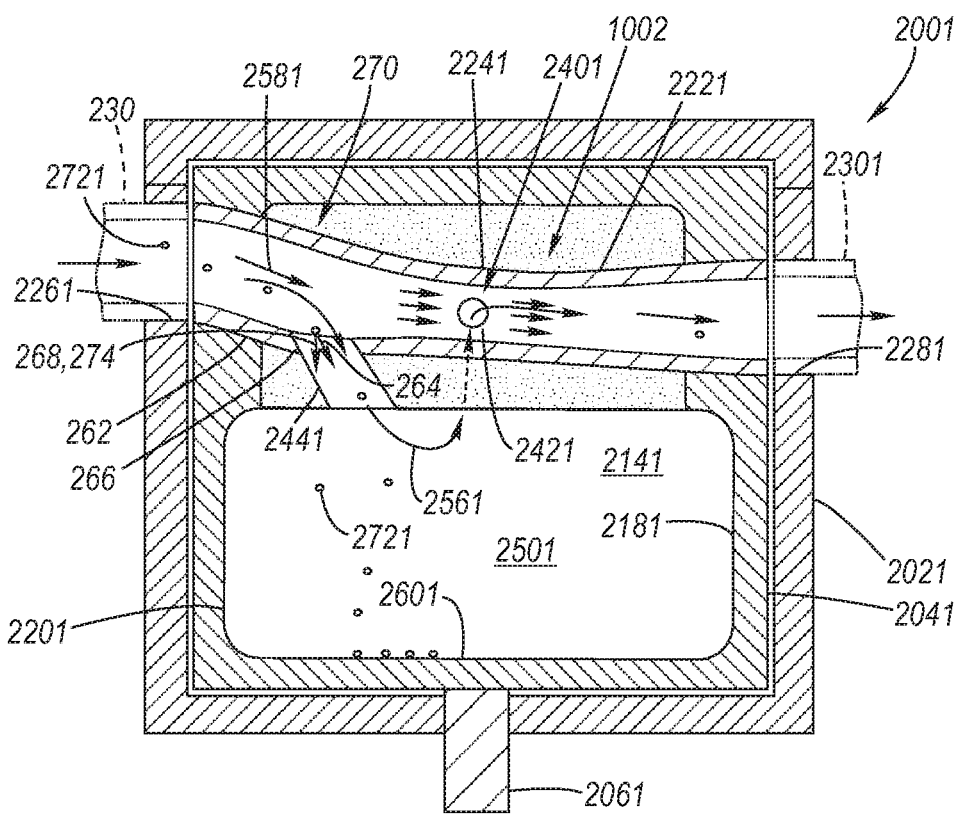
FIG. 7 is a sectional view of a barrel valve equipped with the quiescent zone fluid filter, similar to that of FIG. 4, wherein now an upstream communication port particle entry agency is depicted.

FIG. 7 depicts an alternate view of FIG. 4, having like parts with like numeral designations, wherein the fluid flow tube 2221 is configured to provide an upstream communication port particle entry agency 270 for urging particles 272, particularly particles of larger size, to enter into the upstream communication port 2441. By way of example, the upstream communication port particle entry agency 270 may include: a gravitational gradient 262 of the fluid flow tube disposed upstream of the upstream communication port so as to provide a gravitationally downward momentum 264 on the particles; the fluid flow tube having a bend 266 disposed upstream of the upstream communication port which serves to provide a downward centrifugal force 268 on the particles to urge them to enter the upstream communication port; and the upstream communication port having an opening cross-sectional area much larger than the opening cross-sectional area of the downstream communication port which allows gravitational force 274 to pull the particles into the upstream communication port.

This structural integration of the quiescent zone fluid filter 1001, 1002 with a fluid flow control valve 200, 2001, as for example a barrel valve, enables effective fluid cleaning (i.e., removal of particles) without adding extra add-on components and without dedicated extra component volume. In this regard, the quiescent zone fluid filter utilizes existing space inside the barrel valve in order to filter particles (i.e., debris, etc.) from the fluid flow without increasing the system pressure drop thereacross, as would be the case with a conventional porous medium filter.

The quiescent zone fluid filter of the present invention can also be used in conjunction with a conventional porous medium fluid filter if it is imperative that particles in the fluid be captured in a first pass through the fluid flow circuit. In this regard, it should be noted that in operation of the quiescent zone fluid filter according to the present invention, some particles will generally require repetitive passes through the fluid flow circuit before the quiescent zone fluid filter captures them. For example, the porous medium filter could be disposed upstream of the quiescent zone fluid filter, and be configured so that relatively larger sized particles are captured by its pores, leaving the smaller sized particles to be captured in the quiescent zone.

Figures 8, 9:
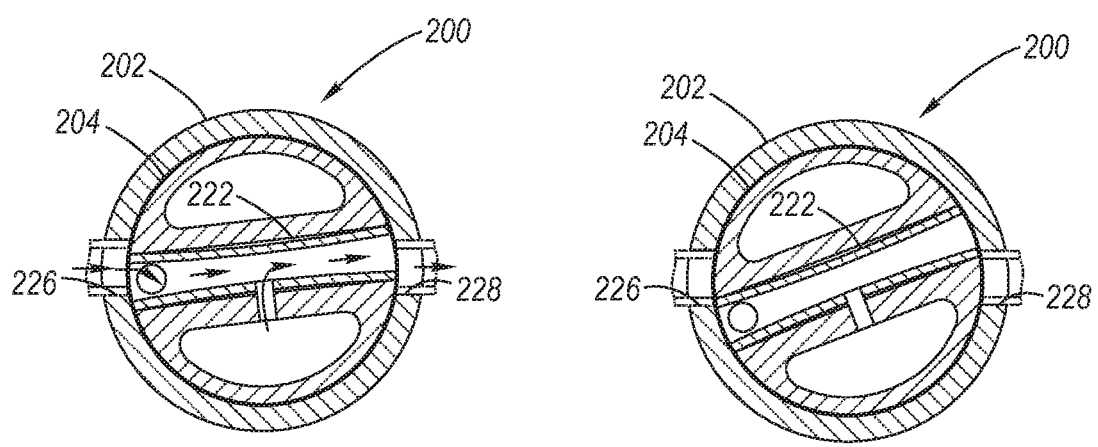
FIGS. 8 and 9 are sectional views of a barrel valve equipped with the quiescent zone fluid filter, similar to that of FIG. 6, wherein now

Turning attention now additionally to FIGS. 8 and 9, an example of operation of the quiescent zone fluid filter 1001 within a fluid flow control valve 200 will be detailed.

With the valve barrel 204 in its fully open state, as depicted at FIGS. 3 through 6, fluid flows through the fluid flow tube 222, entering at the inlet port 246 and exiting at the outlet port 248. A fraction of the fluid flowing in the fluid flow tube passes into the upstream communication port, as does a portion of the particles 252 present therein. These particles then descend through the fluid in the quiescent zone established by the reservoir to the bottom of the reservoir. The liquid in the reservoir quiescently flows and thereupon exits free of particles via the downstream communication port back into the fluid flow of the fluid flow tube, the exiting being aided by a venturi effect 240 thereat.

As shown in FIG. 8, the foregoing process continues even though the valve barrel 204 has been rotated to a partly open state. However, as shown at FIG. 9, when its fully closed state has been achieved, no fluid flows, and the barrel valve 200 has interrupted flow of the fluid in a manner consistent with the programming of the electronic controller 210.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A fluid valve with integrated fluid filter, comprising:
   a fluid flow control valve, comprising:
      an outer valve housing;
      an inner valve housing contained within said outer valve housing and rotatably mounted with respect thereto;
      an inlet port formed in said outer valve housing; and
      an outlet port formed in said outer valve housing; and
   a quiescent zone fluid filter contained within said inner valve housing, said quiescent zone fluid filter comprising:
      a fluid flow tube, said fluid flow tube communicating with said inlet port and said outlet port responsive to rotative position of said inner valve housing with respect to said outer valve housing;
      a reservoir contained in said inner valve housing adjacent and generally below said fluid flow tube with respect to gravity;
      an upstream communication port connecting said fluid flow tube with said reservoir; and
      a downstream communication port connecting said fluid flow tube with said reservoir;
      wherein the upstream communication port is skewed with respect to the downstream communication port;
   wherein when a liquid flows into said inlet port through said fluid flow tube and out said outlet port, said downstream communication port is disposed in downstream relation with respect to said upstream communication port;
   wherein a portion of the liquid flow passes through said upstream communication port into said reservoir;
   wherein the portion of the liquid flow that passed through said upstream communication port moves in said reservoir from said upstream communication port to said downstream communication port as a sluggish liquid flow such that any particles therein descend in said reservoir, whereupon the portion of the liquid that passed through said upstream communication port enters the fluid flow tube via said downstream communication port substantially free of the particles; and
   wherein with said quiescent zone filter fully seated with respect to said outer valve housing, rotation of said inner valve housing with respect to said outer valve housing selectively regulates the liquid flow from said inlet port to said outlet port ranging between a fully open state of liquid flow and a fully closed state of liquid flow.

2. The fluid valve with integrated fluid filter of claim 1, wherein said quiescent zone fluid filter further comprises a venturi effect disposed in said fluid flow tube at said downstream communication port.

3. The fluid valve with integrated fluid filter of claim 2, wherein said quiescent zone fluid filter further comprises said fluid flow tube being configured to provide an upstream communication port particle entry agency upstream in relation to said upstream communication port, wherein said upstream communication port particle entry agency urges particles in the fluid flow tube to enter into said upstream communication port.

4. The fluid valve with integrated fluid filter of claim 3, wherein said upstream communication port particle entry agency comprises a gravitational gradient in said fluid flow tube down hill with respect to said upstream communication port.

5. The fluid valve with integrated fluid filter of claim 3, wherein said upstream communication port particle entry agency comprises a bend in said fluid flow tube which provides a centrifugal force on said particles so as to urge said particles to enter into said upstream communication port.

6. The fluid valve with integrated fluid filter of claim 3, wherein said upstream communication port particle entry agency comprises said upstream communication port having an upstream opening cross-section predetermined such that gravity urges said particles into said upstream communication port.

7. The fluid valve with integrated fluid filter of claim 1, wherein said inner valve housing comprises a valve barrel.

8. The fluid valve with integrated fluid filter of claim 1, further comprising:
- an actuator connected to said inner housing;
- at least one sensor; and
- an electronic controller electrically connected to said at least one sensor and said actuator;
- wherein said actuator rotates said inner valve housing with respect to said outer valve housing between the fully open state of liquid flow and the fully closed state of liquid flow responsive to said electronic controller and said at least one sensor.

* * * * *